United States Patent
Miller et al.

(10) Patent No.: US 7,556,579 B2
(45) Date of Patent: Jul. 7, 2009

(54) TRANSMISSION SHIFT SYSTEM

(75) Inventors: Jeffrey David Miller, Peosta, IA (US); Steve Gary Fleischmann, Dubuque, IA (US); Timothy Bernard French, Dubuque, IA (US)

(73) Assignee: Deere & Company, Moline, IL (US)

( * ) Notice: Subject to any disclaimer, the term of this patent is extended or adjusted under 35 U.S.C. 154(b) by 420 days.

(21) Appl. No.: 11/550,072

(22) Filed: Oct. 17, 2006

(65) Prior Publication Data

US 2008/0090700 A1 Apr. 17, 2008

(51) Int. Cl.
*F16H 59/04* (2006.01)
(52) U.S. Cl. ...................... 475/123; 475/116
(58) Field of Classification Search ............... 475/116, 475/123; 477/131
See application file for complete search history.

(56) References Cited

U.S. PATENT DOCUMENTS

| | | | | |
|---|---|---|---|---|
| 5,213,013 A * | 5/1993 | Fujiwara et al. | ............ | 475/120 |
| 5,305,663 A * | 4/1994 | Leonard et al. | ............ | 475/123 |
| 5,351,570 A * | 10/1994 | Mizunuma et al. | ............ | 74/335 |
| 5,433,124 A * | 7/1995 | Person | ............ | 74/335 |
| 5,454,763 A * | 10/1995 | Ikebuchi et al. | ............ | 475/128 |
| 5,492,523 A * | 2/1996 | Leonard | ............ | 475/131 |
| 5,697,864 A * | 12/1997 | Watanabe | ............ | 477/98 |
| 6,206,802 B1 * | 3/2001 | Kim | ............ | 477/127 |
| 6,488,610 B2 * | 12/2002 | Micklash et al. | ............ | 477/131 |
| 6,607,460 B2 * | 8/2003 | Park et al. | ............ | 475/123 |
| 7,419,452 B2 * | 9/2008 | Nozaki et al. | ............ | 475/123 |

* cited by examiner

*Primary Examiner*—Ha D. Ho
(74) *Attorney, Agent, or Firm*—Taylor & Aust, P.C.

(57) ABSTRACT

A transmission shift system includes a first control path having a first electrically actuated valve system, and is configured to selectively direct hydraulic pressure to a first plurality of clutches for selecting only an output speed. A second control path independent of the first control path includes a second electrically actuated valve system, and is configured to selectively direct hydraulic pressure to a second plurality of clutches for selecting only an output direction. A shifter has a plurality of switches, each switch being in direct electrical connection with a corresponding of the first electrically actuated valve system and the second electrically actuated valve system for operating the first control path and the second control path controllerlessly, wherein the plurality of switches are operated manually using the shifter.

22 Claims, 3 Drawing Sheets

TRANSMISSION SHIFT SYSTEM

FIELD OF THE INVENTION

The present invention relates to transmissions, and more particularly, to a transmission shift system.

BACKGROUND OF THE INVENTION

Work machines are used in many industries, such as the agricultural, construction, and forestry related industries, and employ transmissions for driving the work machine to and from various work sites, and for operating the work machine in performing its designated tasks. The transmissions of such work machines typically have more than one forward gear and more than one reverse gear so as to allow a gear to be selected that is optimal for the task at hand. In order to select and switch between gears, transmissions employ a shift system that actuates one or more hydraulic clutches in order to engage the desired gear.

The transmission shift systems of present work machine transmissions are often complex, requiring the use of an electronic controller that accepts input from a shift device, such as a shift lever, a dial, etc. Such controllers use the input to control valves that operate the appropriate clutches in order to obtain the desired transmission output speed, i.e., first gear, second gear, third gear, etc, and high range or low range, and to obtain the desired transmission output direction, i.e., forward, neutral, and reverse. However, a failure of the controller or any component in the control path, such as a valve, may have unforeseen consequences, such as unintended motion of the work machine.

Once such a failure has taken place, diagnostics are required to ensure that the failed component is accurately determined, which can then be repaired or replaced. However, with such controller-based transmission shift systems, the failures are often "hidden," in the sense that it may be difficult to determine which component in the control path has failed. Often, special diagnostic tools are required in order to determine what component has failed, making it difficult to diagnose and correct failures in the field, even where only a single component of the transmission shift system has failed.

Hence, it is desirable to have a transmission shift system wherein a single-point failure, i.e., the failure of a single component of the transmission shift system, does not result in unintended motion, and wherein the single-point failure may be readily diagnosed in the field by the operator of the work machine, without the use of special diagnostic tools.

SUMMARY OF THE INVENTION

The present invention provides a transmission shift system for shifting a transmission without a controller.

The invention, in one form thereof, is directed to a transmission shift system for a transmission. The transmission has a first plurality of clutches for determining only an output speed of the transmission and a second plurality of clutches for determining only an output direction of the transmission, wherein the first plurality of clutches and the second plurality of clutches are hydraulically actuated via hydraulic pressure from a hydraulic pressure source. The transmission shift system includes a first control path in fluidic connection with the hydraulic pressure source, the first control path including a first electrically actuated valve system and being configured to selectively direct the hydraulic pressure to the first plurality of clutches for selecting only the output speed; a second control path in fluidic connection with the hydraulic pressure source, the second control path including a second electrically actuated valve system and being configured to selectively direct the hydraulic pressure to the second plurality of clutches for selecting only the output direction, the second control path being independent of the first control path; and a shifter having a plurality of switches, each switch of the plurality of switches being in direct electrical connection with a corresponding of the first electrically actuated valve system and the second electrically actuated valve system for operating the first control path and the second control path controllerlessly, wherein the plurality of switches are operated manually using the shifter.

The invention, in another form thereof, is directed to a transmission shift system for a transmission. The transmission has a plurality of clutches for engaging a corresponding plurality of gears of the transmission, wherein the plurality of clutches are hydraulically actuated via hydraulic pressure from a hydraulic pressure source. The transmission shift system includes: a first hydraulic passage exposed to the hydraulic pressure source; a first solenoid valve in fluidic connection with the first hydraulic passage; a second solenoid valve; a second hydraulic passage fluidly coupling the first solenoid valve and the second solenoid valve; a third hydraulic passage fluidly coupling the first solenoid valve and the second solenoid valve; a fourth hydraulic passage fluidly coupling the second solenoid valve with at least a first clutch of the plurality of clutches; and a fifth hydraulic passage fluidly coupling the second solenoid valve with at least a second clutch of the plurality of clutches. Each of the first solenoid valve and the second solenoid valve have only an energized state and a de-energized state.

The invention, in yet another form thereof, is directed to a work machine. The work machine includes a transmission having a first plurality of clutches for determining only an output speed of the transmission and a second plurality of clutches for determining only an output direction of the transmission, wherein the first plurality of clutches and the second plurality of clutches are hydraulically actuated via hydraulic pressure from a hydraulic pressure source; and a transmission shift system for shifting the transmission. The transmission shift system includes a first control path in fluidic connection with the hydraulic pressure, the first control path including a first electrically actuated valve system and being configured to selectively direct the hydraulic pressure to the first plurality of clutches for selecting only the output speed; a second control path in fluidic connection with the hydraulic pressure source, the second control path including a second electrically actuated valve system and being configured to selectively direct the hydraulic pressure to the second plurality of clutches for selecting only the output direction, the second control path being independent of the first control path; and a shifter having a plurality of switches, each switch of the plurality of switches being in direct electrical connection with a corresponding of the first electrically actuated valve system and the second electrically actuated valve system for operating the first control path and the second control path controllerlessly to shift the transmission of the work machine, wherein the plurality of switches are operated manually using the shifter.

The invention, in still another form thereof, is directed to a work machine. The work machine includes a transmission having a plurality of clutches for engaging a corresponding plurality of gears of the transmission, wherein the plurality of clutches are hydraulically actuated via hydraulic pressure from a hydraulic pressure source; and a transmission shift system for shifting the transmission. The transmission shift system includes: a first hydraulic passage exposed to the hydraulic pressure source; a first solenoid valve in fluidic connection with the first hydraulic passage; a second solenoid valve; a second hydraulic passage fluidly coupling the first solenoid valve and the second solenoid valve; a third hydraulic passage fluidly coupling the first solenoid valve and the second solenoid valve; a fourth hydraulic passage fluidly coupling the second solenoid valve with at least a first clutch of the plurality of clutches; and a fifth hydraulic passage fluidly coupling the second solenoid valve with at least a second clutch of the plurality of clutches, wherein each of the first solenoid valve and the second solenoid valve have only an energized state and a de-energized state.

DETAILED DESCRIPTION OF THE INVENTION

Figure 1:
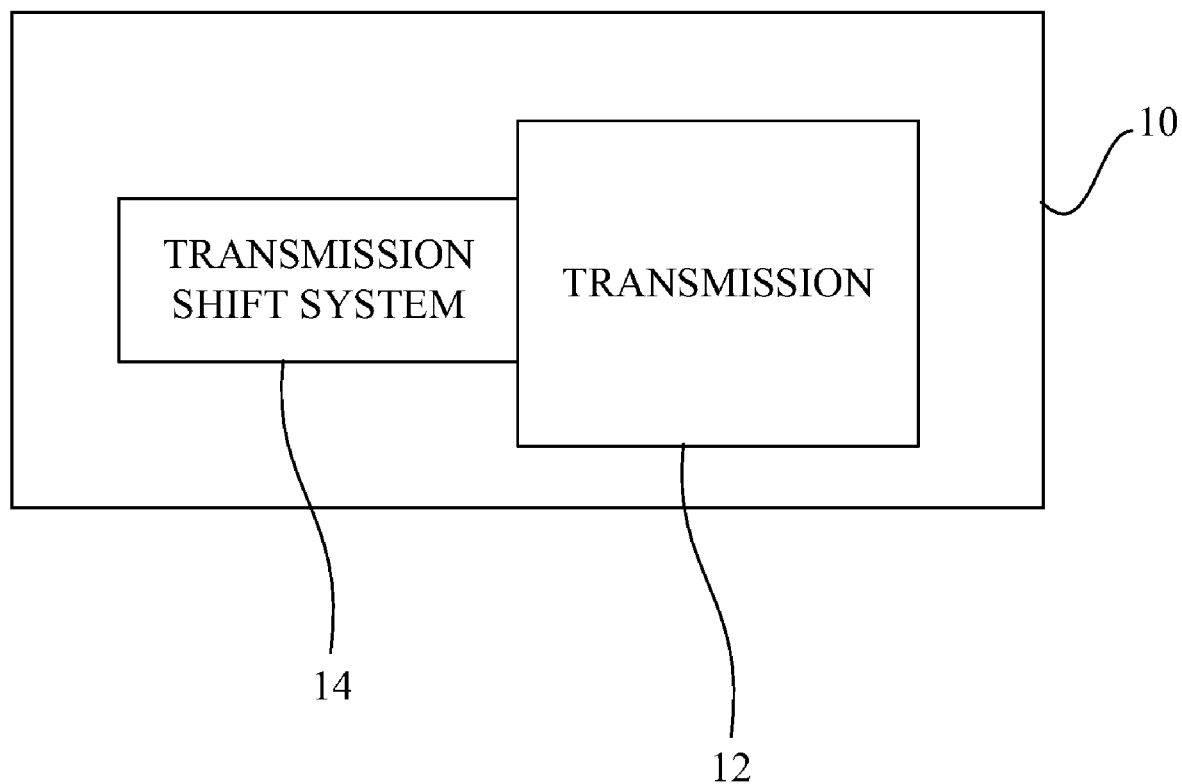
FIG. 1 is a diagrammatic depiction of a work machine having a transmission and a transmission shift system in accordance with an embodiment of the present invention

Referring now to FIG. 1, there is shown a work machine 10 in accordance with an embodiment of the present invention. Work machine 10 is a machine powered by an engine (not shown), and is used to perform work in one or more of various undertakings. For example, work machine 10 may be a backhoe loader, a motor grader, an excavator or another machine used in the construction industry. In other examples, work machine 10 may be a feller buncher, a knuckleboom loader, a harvester, or another machine used in the forestry industry, or may be a tractor, a combine, or another agricultural machine.

Work machine 10 includes a transmission 12 that is powered by the engine, and a transmission shift system 14 for shifting transmission 12. Transmission 12 powers a drive train (not shown) that is used to move work machine 10 about when performing its designated work. Transmission 12 may also be used to power various implements or other features of work machine 10.

Transmission 12 includes gears (not shown) that are engaged by clutches to determine the output speed and direction (neutral, forward, reverse) of transmission 12. The clutches are hydraulic clutches that are controlled by transmission shift system 14, as set forth in the embodiments discussed below.

Figure 2:
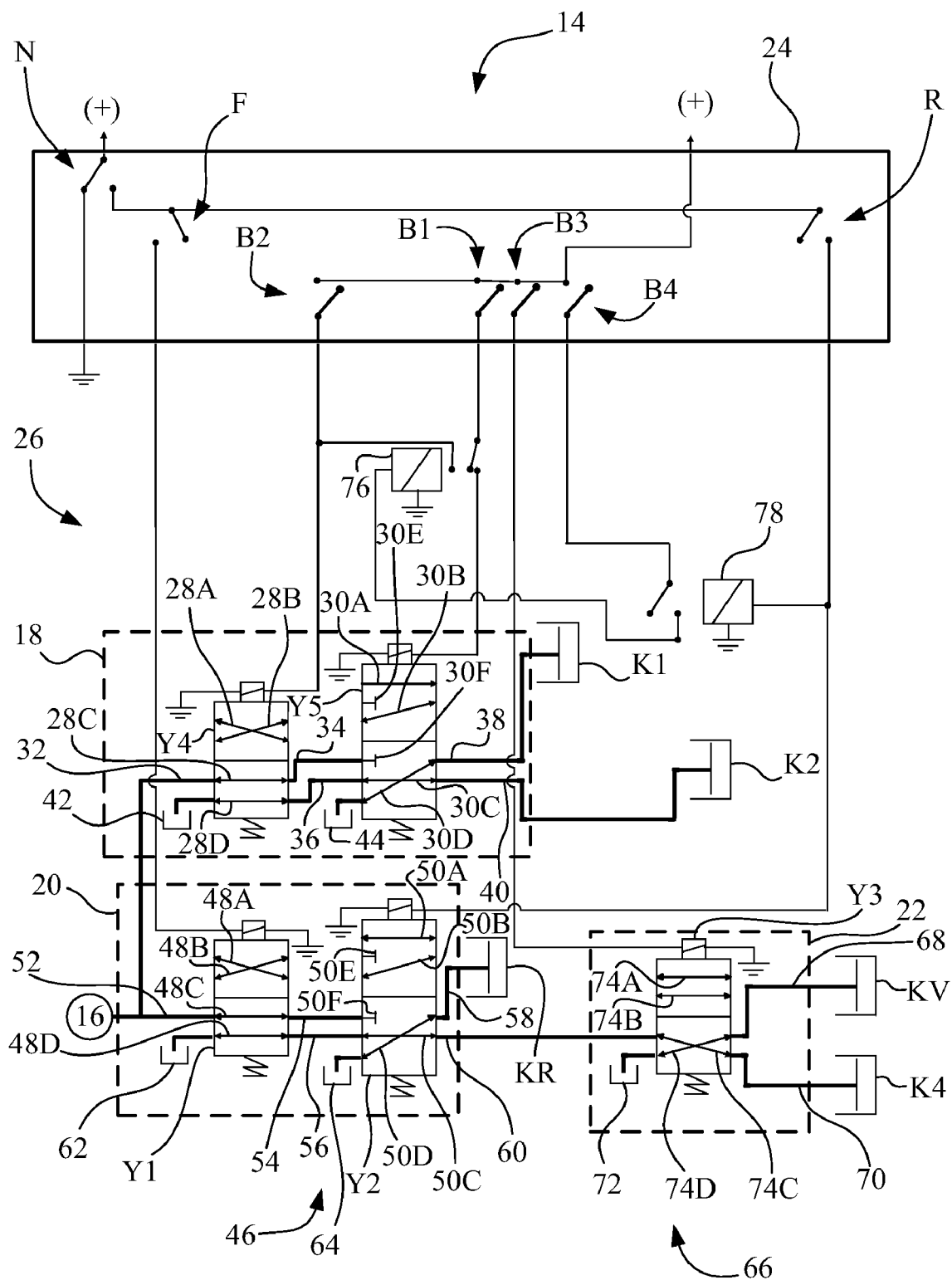
FIG. 2 is a schematic diagram of the transmission shift system of FIG. 1 in accordance with an embodiment of the present invention.

Referring now to FIG. 2, an embodiment of transmission shift system 14 in accordance with the present invention is depicted. In the embodiment of FIG. 2, transmission 12 is a 4×2 transmission, that is, a transmission having four forward gears and two reverse gears. Transmission 12 has a first plurality of clutches K1, K2 for determining only an output speed of transmission 12, and a second plurality of clutches KV, KR for determining only an output direction of transmission 12, wherein first plurality of clutches K1, K2 and second plurality of clutches KV, KR are hydraulically actuated via hydraulic pressure from a hydraulic pressure source 16, such as a hydraulic pump associated with transmission 12 or work machine 10. In the present embodiment, clutches K1 and K2 engage/disengage $1^{st}$ and $2^{nd}$ gears, respectively, whereas clutches KV and KR engage/disengage gears for forward and reverse, respectively.

Transmission 12 also includes an additional clutch K4, which is used in conjunction with clutch KV for determining one of a high speed range and a low speed range for forward movement. Clutch KV pertains to low range, whereas clutch K4 pertains to high range. In order to obtain forward movement of work machine 10, either, but not both, of clutches KV and K4 must be engaged. Hence, both clutches KV and K4 are considered herein as determining the output direction of transmission 12, and hence, are both considered as part of the second plurality of clutches set forth above. Transmission 12 is in neutral if none of clutches KV, K4, and KR are engaged.

Transmission shift system 14 includes a control path 18, a control path 20, and a control path 22, which are valve operated hydraulic circuits that operate the clutches of transmission 12, and a shifter 24 for allowing the operator of work machine 10 to shift transmission 12. Control path 18 and control path 20 are each in fluidic connection with hydraulic pressure source 16. Control path 22 is independent of control path 18. Control path 22 is in fluidic connection with control path 20.

Control path 18 is configured to selectively direct hydraulic pressure to clutches K1 and K2 to control clutches K1 and K2 for selecting only an output speed of transmission 12. As used herein, the term, "selectively," means that control path 18 is configured to direct hydraulic pressure to either of clutches K1 and K2, or to neither of clutches K1 and K2, in which latter case, hydraulic fluid from the clutches are channeled via control path 18 to drains, as set forth below.

Accordingly, control path 18 includes an electrically actuated valve system 26, a plurality of hydraulic passages, and a plurality of drains. Electrically actuated valve system 26 includes a first solenoid valve pair configured to selectively direct the hydraulic pressure to clutches K1 and K2. In particular, the first solenoid valve pair includes a solenoid valve Y4 having valve passages 28A-28D, and a solenoid valve Y5 having valve passages 30A-30D and hydraulic checks 30E and 30F. Each of first solenoid valve Y4 and solenoid valve Y5 have an energized state and a de-energized state. Valve passages 28A-28D and valve passages 30A-30D pass hydraulic pressure/flow through the valve, whereas hydraulic checks 30E and 30F check the hydraulic pressure/flow to prevent its passage through the valve.

Solenoid valve Y4 and solenoid valve Y5 are jointly configured, i.e., via the configuration of valve passages 28A-28D, valve passages 30A-30D, and hydraulic checks 30E and 30F, to provide the hydraulic pressure to one or more clutch of the first plurality of clutches only when solenoid valve Y4 is in one of an energized state and a de-energized state and second solenoid valve Y5 is in the other of the energized state and de-energized state. Solenoid valve Y4 and solenoid valve Y5 are also jointly configured to drain hydraulic pressure from the first plurality of clutches into at least one drain of the plurality of drains when first solenoid valve Y4 and second solenoid valve Y5 are both in the same of one of the energized state and the de-energized state.

In the present embodiment, control path 18 includes hydraulic passages 32, 34, 38, and 40, and drains 42 and 44. Hydraulic passage 32 is exposed to hydraulic pressure source 16, and is in fluidic connection with solenoid valve Y4. Hydraulic passage 34 fluidly couples solenoid valve Y4 and solenoid valve Y5. Hydraulic passage 36 also fluidly couples solenoid valve Y4 and solenoid valve Y5. Hydraulic passage 38 fluidly couples solenoid valve Y5 with at least a first clutch of the plurality of clutches, which in the present embodiment is clutch K1. Hydraulic passage 40 fluidly couples solenoid valve Y5 with at least a second clutch of the plurality of clutches, which in the present embodiment is clutch K2.

Drain 42 is in fluidic connection with solenoid valve Y4, and drain 44 is in fluidic connection with solenoid valve Y5.

Solenoid valve Y4 and solenoid valve Y5 are depicted in FIG. 2 in the de-energized state. Solenoid valve Y4 and solenoid valve Y5 are jointly configured to channel hydraulic pressure to only one of hydraulic passage 38 and hydraulic passage 40 when solenoid valve Y4 is in one of the energized state and de-energized state and solenoid valve Y5 is in the other of the energized state and the de-energized state. In addition, solenoid valve Y4 and solenoid valve Y5 are jointly configured to channel hydraulic pressure to only the other of hydraulic passage 38 and hydraulic passage 40 when solenoid valve Y4 is in the other of the energized state and de-energized state and solenoid valve Y5 is in the one of the energized state and the de-energized state. Also, solenoid valve Y4 and solenoid valve Y5 are configured to shield both of hydraulic passage 38 and hydraulic passage 40 from the hydraulic pressure when both solenoid valve Y4 and solenoid valve Y5 are in the same one of the energized state and the de-energized state, i.e., in the same state. In addition, solenoid valve Y4 and solenoid valve Y5 are configured to fluidly expose hydraulic passage 38 to one of drain 42 and drain 44, and to fluidly expose hydraulic passage 40 to the other of drain 42 and drain 44 when solenoid valve Y4 and solenoid valve Y5 are in the same one of the energized state and the de-energized state.

Control path 20 is in fluidic connection with hydraulic pressure source 16, and is configured to selectively direct hydraulic pressure to clutches KV/K4 and KR to control clutches KV/K4 and KR for selecting only the output direction of transmission 12. For purposes of control path 20, clutches KV and K4 are considered a single unit; control as between clutches KV and K4 is provided via control path 22, and is discussed subsequent to the present discussion of control path 20. As used herein, the term, "selectively," means that control path 20 is configured to direct hydraulic pressure to either of clutches KV/K4 and KR, i.e., for forward and reverse, respectively, or to neither of clutches KV/K4 and KR, i.e., for neutral.

Accordingly, control path 20 includes an electrically actuated valve system 26, a plurality of hydraulic passages, and a plurality of drains. Electrically actuated valve system 26 includes a solenoid valve pair configured to selectively direct the hydraulic pressure to clutches KV/K4 and KR. In particular, the second solenoid valve pair includes a solenoid valve Y1 having valve passages 48A-48D, and a solenoid valve Y2 having valve passages 50A-50D and hydraulic checks 50E and 50F. Each of first solenoid valve Y1 and solenoid valve Y2 has an energized state and a de-energized state. Valve passages 48A-48D and valve passages 50A-50D pass hydraulic pressure/flow through the valve, whereas hydraulic checks 50E and 50F check the hydraulic pressure/flow to prevent its passage through the valve.

Solenoid valve Y1 and solenoid valve Y2 are jointly configured, i.e., via the configuration of valve passages 48A-48D, valve passages 50A-50D, and hydraulic checks 50E and 50F, to provide hydraulic pressure to one or more clutch of the second plurality of clutches only when solenoid valve Y1 is in one of an energized state and a de-energized state and solenoid valve Y2 is in the other of the energized state and the de-energized state. Solenoid valve Y1 and solenoid valve Y2 are also jointly configured to drain the hydraulic pressure from the second plurality of clutches into at least one drain of the plurality of drains when solenoid valve Y1 and solenoid valve Y2 are both in the same of one of the energized state and the de-energized state.

In the present embodiment, control path 20 includes hydraulic passages 52, 54, 58, and 60, and drains 62 and 64. Hydraulic passage 52 is exposed to hydraulic pressure source 16, and is in fluidic connection with solenoid valve Y1. Hydraulic passage 54 fluidly couples solenoid valve Y1 and solenoid valve Y2. Hydraulic passage 56 also fluidly couples solenoid valve Y1 and solenoid valve Y2. Hydraulic passage 58 fluidly couples solenoid valve Y2 with clutch KR. Hydraulic passage 60 fluidly couples solenoid valve Y2 with one of clutches KV and K4, as set forth below. Drain 62 is in fluidic connection with solenoid valve Y1, and drain 64 is in fluidic connection with solenoid valve Y2.

Solenoid valve Y1 and solenoid valve Y2 are also depicted in FIG. 2 in the de-energized state. Solenoid valve Y1 and solenoid valve Y2 are jointly configured to channel hydraulic pressure to only one of hydraulic passage 58 and hydraulic passage 60 when solenoid valve Y1 is in one of the energized state and de-energized state, and solenoid valve Y2 is in the other of the energized state and the de-energized state. In addition, solenoid valve Y1 and solenoid valve Y2 are jointly configured to channel hydraulic pressure to only the other of hydraulic passage 58 and hydraulic passage 60 when solenoid valve Y1 is in the other of the energized state and de-energized state and solenoid valve Y2 is in the one of the energized state and the de-energized state. Also, solenoid valve Y1 and solenoid valve Y2 are configured to shield both of hydraulic passage 58 and hydraulic passage 60 from the hydraulic pressure when both solenoid valve Y1 and solenoid valve Y2 are in the same one of the energized state and the de-energized state, i.e., in the same state. In addition, solenoid valve Y1 and solenoid valve Y2 are configured to fluidly expose hydraulic passage 58 to one of drain 62 and drain 64, and to fluidly expose hydraulic passage 60 to the other of drain 62 and drain 64 when solenoid valve Y1 and solenoid valve Y2 are in the same one of the energized state and the de-energized state.

Control path 22 is configured to selectively direct the hydraulic pressure to clutches KV and K4 to control clutches KV and K4 for selecting either high speed range or low speed range. As used herein, the term, "selectively," means that control path 22 is configured to direct hydraulic pressure to either of clutches KV and K4, or to neither of clutches KV and K4, in which latter case, hydraulic fluid from the clutches are channeled via control path 22 to a drain, as set forth below. Control path 22 is used in conjunction with control path 20. For example, when a transmission forward output direction is desired, control path 20 provides hydraulic pressure to hydraulic passage 60 for direction to either clutch KV or K4, thus providing for the selection of high and low range.

Accordingly, control path 22 includes an electrically actuated valve system 66, a plurality of hydraulic passages, and a drain. In the present embodiment, control path 22 includes a hydraulic passage 68, a hydraulic passage 70, and a drain 72. Electrically actuated valve system 66 includes a solenoid valve Y3, depicted in the de-energized state, which is fluidly coupled to solenoid valve Y2 via hydraulic passage 60. Hydraulic passage 68 fluidly couples solenoid valve Y3 with clutch KV, whereas hydraulic passage 70 fluidly couples solenoid valve Y3 with clutch K4. By virtue of this arrangement, control path 20 may direct hydraulic pressure to hydraulic passage 60, where it will be directed by solenoid valve Y3 to one of hydraulic passage 68 and hydraulic passage 70, hence engaging clutch KV or K4, respectively, whereas the other of hydraulic passage 68 and hydraulic passage 70 will be exposed to drain 72, via valve passages 74A-74D of solenoid valve Y3, hence draining clutch KV or K4, respectively.

Shifter 24 includes a plurality of switches, switches N, F, R, B1, B2, and B3, each of which is in direct electrical connection with a corresponding of electrically actuated valve system 26, electrically actuated valve system 46, and electrically actuated valve system 66, for respectively operating control path 18, control path 20, and control path 22 controllerlessly, wherein the plurality of switches are operated manually using the shifter. In the present embodiment, shifter 24 includes an additional switch B4. Shifter 24 is a device used to manually open and close the contacts of the switches N, F, R, B1, B2, B3, and B4, i.e., by the hand of the operator of work machine 10, and may be, for example, a lever, a dial, a combination thereof, or free-standing switches.

Switches B1 and B2 are in direct electrical connection with solenoid valve Y5 and solenoid valve Y4, respectively, to controllerlessly operate solenoid valve Y5 and solenoid valve Y4. Switches F and R, for forward and reverse, respectively, are in direct electrical connection with solenoid valve Y1 and solenoid valve Y2 to controllerlessly operate solenoid valve Y1 and solenoid valve Y2. Similarly, switch B3, for high/low range, is in direct electrical connection with solenoid valve Y3 to controllerlessly operate solenoid valve Y3.

By being in direct electrical connection, it is meant that the switches directly operate electrically actuated valve system 26, electrically actuated valve system 46, and electrically actuated valve system 66, without the use of a controller, i.e., without the use of a controller that employs software, firmware, memory, and/or logic devices, and/or a microprocessor to effect an output of the controller and the operation of the solenoid valves of transmission shift system 14. Hence, transmission shift system 14 is referred to as being controllerless, since the switches directly operate control path 18, control path 20, and control path 22 controllerlessly, that is, without the use of a controller.

Interspersed between switch B2 and solenoid valve Y5 is a disable relay 76 that is controlled by switch B4 and a high-range reverse relay 78. When shifter 24 is placed into any reverse gear, switch R is closed, which activates high-range reverse relay 78, and when shifter 24 is placed in the third and fourth reverse gear positions, switch B4 is also closed, thus activating disable relay 76 via switch B4 and a high-range reverse relay 78. When activated, disable relay 76 removes switch B1 from electrical connection with solenoid valve Y5, and places switch B1 in direct electrical connection with solenoid valve Y4, in place of solenoid valve Y5.

Switch N is a neutral-enable switch, which in the open position cuts off electrical power from switches F, R, B1, B2, B3, and B4, resulting in transmission 12 being in neutral. When in the closed position, switch N allows power to flow through whichever of switches F, R, B1, B2, B3, and B4 are closed by the action of shifter 24.

Referring now to TABLE 1, in conjunction with FIG. 2, the operation of the embodiment of FIG. 2 is now described. TABLE 1 depicts, for each gear position of shifter 24, the energized solenoids, engaged clutches, and closed switches B1-B4, as indicated by an "X" in the appropriate columns of TABLE 1. The gear positions of shifter 24 are first through fourth forward gear positions (1F-4F), neutral (N), and first through fourth reverse gear positions (1R-4R). Switch N is closed, except when shifter 24 is placed in neutral, switch F is closed only when a forward gear position is selected, and switch R is closed only when a reverse gear position is selected.

TABLE 1

Energized solenoids, engaged clutches, and closed switches for each gear position of shifter 24 in the embodiment of FIG. 2.

| GEAR | ENERGIZED SOLENOIDS | | | | | ENGAGED CLUTCHES | | | | | CLOSED SWITCHES | | | |
| --- | --- | --- | --- | --- | --- | --- | --- | --- | --- | --- | --- | --- | --- | --- |
| | Y1 | Y2 | Y3 | Y4 | Y5 | KV | KR | K1 | K2 | K4 | B1 | B2 | B3 | B4 |
| 1F | X | | X | | X | X | | X | | | X | | X | |
| 2F | X | X | X | | | X | | | X | | | X | X | |
| 3F | X | | | X | | | | X | | X | X | | | X |
| 4F | X | | | X | | | | | X | X | | X | | X |
| N | | | | | | | | | | | | | | |
| 1R | | X | X | | X | | X | X | | | X | | X | |
| 2R | | X | X | X | | | X | | X | | | X | X | |
| 3R | | X | | X | | | X | | X | X | X | | | X |
| 4R | | X | | X | | | X | | X | X | | X | | X |

In discussing the operation of the embodiment of FIG. 2, it will be kept in mind that solenoid valves Y1, Y2, Y3, Y4, and Y5 are depicted in FIG. 2 in the de-energized state. The valve passages and hydraulic checks in use during the de-energized state are valve passages 48C and 48D for solenoid valve Y1; valve passages 50C, 50D, and hydraulic check 50F for solenoid valve Y2; valve passages 74C and 74D for solenoid valve Y3; valve passages 28C and 28D for solenoid valve Y4; and valve passages 30C and 30D, and hydraulic check 30F for solenoid valve Y5. The valve passages and hydraulic checks in use during the energized state are valve passages 48A and 48B for solenoid valve Y1; valve passages 50A and 50B, and hydraulic check 50E for solenoid valve Y2; valve passages 74A and 74B for solenoid valve Y3; valve passages 28A and 28B for solenoid valve Y4; and valve passages 30A and 30B, and hydraulic check 30E for solenoid valve Y5.

With shifter 24 in the neutral position, all solenoid valves are in the de-energized state, and each clutch is exposed to a drain, which prevents actuation of the clutches. For example, clutch K1 is exposed to drain 44 via hydraulic passage 38 and valve passage 30D of solenoid valve 4. Clutch K2 is exposed to drain 42 via hydraulic passage 40, valve passage 30C of solenoid valve Y5, hydraulic passage 36, and valve passage 28D of solenoid valve Y4. Clutch KR is exposed to drain 64 via hydraulic passage 58 and valve passage 50D of solenoid valve Y2. Clutch KV is directed to drain 72 via hydraulic passage 68 and valve passage 74D of solenoid valve Y3. Clutch K4 is directed to drain 62 via hydraulic passage 70, valve passage 74C of solenoid valve Y3, hydraulic passage 60, valve passage 50C of solenoid valve Y2, hydraulic passage 56, and valve passage 48D of solenoid valve Y1.

Placing shifter 24 into the first forward gear position closes switches N, F, B1 and B3. Electrical power flowing through switch N is directed through switches F, B1, and B3, and hence is delivered to solenoid valves Y1, Y3, and Y5, respectively, placing solenoid valves Y1, Y3, and Y5 in the energized state. Since reverse switch R and switch B2 are not closed, solenoid valves Y2 and Y4, respectively, remain in a de-energized state. With shifter 24 in the first forward gear position, hydraulic pressure from hydraulic pressure source 16 is directed to engage clutch K1 via hydraulic passage 32, valve passage 28C of solenoid valve Y4, hydraulic passage 34, valve passage 30A of solenoid valve Y5, and hydraulic passage 38. Clutch K2 is exposed to drain 44 via hydraulic passage 40 and valve passage 30B, and hence, is not engaged.

In addition, hydraulic pressure from hydraulic pressure source 16 is directed to engage clutch KV via hydraulic passage 52, valve passage 48A of solenoid valve Y1, hydraulic passage 56, valve passage 50C of solenoid valve Y2, hydraulic passage 60, valve passage 74A of solenoid valve Y3, and hydraulic passage 68. Clutch K4 is exposed to drain 72 via hydraulic passage 70 and valve passage 74B of solenoid valve Y3, and hence, is not engaged.

Placing shifter 24 into the second forward gear position closes switches N, F, B2 and B3. Electrical power flowing through switch N is directed through switches F, B2, and B3, and hence is delivered to solenoid valves Y1, Y3, and Y4, respectively, placing solenoid valves Y1, Y3, and Y4 in the energized state. Since reverse switch R and switch B1 are not closed, solenoid valves Y2 and Y5, respectively, remain in a de-energized state. With shifter 24 in the second forward gear position, hydraulic pressure from hydraulic pressure source 16 is directed to engage clutch K2 via hydraulic passage 32, valve passage 28A of solenoid valve Y4, hydraulic passage 36, valve passage 30C of solenoid valve Y5, and hydraulic passage 40. Clutch K1 is exposed to drain 44 via hydraulic passage 38 and valve passage 30D, and hence, is not engaged.

In addition, hydraulic pressure from hydraulic pressure source 16 is directed to engage clutch KV via hydraulic passage 52, valve passage 48A of solenoid valve Y1, hydraulic passage 56, valve passage 50C of solenoid valve Y2, hydraulic passage 60, valve passage 74A of solenoid valve Y3, and hydraulic passage 68. Clutch K4 is exposed to drain 72 via hydraulic passage 70 and valve passage 74B of solenoid valve Y3.

Placing shifter 24 into the third forward gear position closes switches N, F, B1, and B4. Electrical power flowing through switch N is directed through switches F, B1, and B4, and hence is delivered to solenoid valves Y1 and Y5, placing solenoid valves Y1 and Y5 in the energized state. Since reverse switch R and switches B2 and B3 are not closed, solenoid valves Y2, Y4, and Y3, respectively, remain in a de-energized state. With shifter 24 in the third forward gear position, hydraulic pressure from hydraulic pressure source 16 is directed to engage clutch K1 via hydraulic passage 32, valve passage 28C of solenoid valve Y4, hydraulic passage 34, valve passage 30A of solenoid valve Y5, and hydraulic passage 38. Clutch K2 is exposed to drain 44 via hydraulic passage 40 and valve passage 30B, and hence, is not engaged.

In addition, hydraulic pressure from hydraulic pressure source 16 is directed to engage clutch K4 via hydraulic passage 52, valve passage 48A of solenoid valve Y1, hydraulic passage 56, valve passage 50C of solenoid valve Y2, hydraulic passage 60, valve passage 74C of solenoid valve Y3, and hydraulic passage 70. Clutch KV is exposed to drain 72 via hydraulic passage 68 and valve passage 74D of solenoid valve Y3, and hence is not engaged.

Placing shifter 24 into the fourth forward gear position closes switches N, F, B2, and B4. Electrical power flowing through switch N is directed through switches F, B2, and B4, and hence is delivered to solenoid valves Y1 and Y4, placing solenoid valves Y1 and Y4 in the energized state. Since reverse switch R and switches B1 and B3 are not closed, solenoid valves Y2, Y5, and Y3, respectively, remain in a de-energized state. With shifter 24 in the fourth forward gear position, hydraulic pressure from hydraulic pressure source 16 is directed to engage clutch K2 via hydraulic passage 32, valve passage 28A of solenoid valve Y4, hydraulic passage 36, valve passage 30C of solenoid valve Y5, and hydraulic passage 40. Clutch K1 is exposed to drain 44 via hydraulic passage 38 and valve passage 30D, and hence, is not engaged.

In addition, hydraulic pressure from hydraulic pressure source 16 is directed to engage clutch K4 via hydraulic passage 52, valve passage 48A of solenoid valve Y1, hydraulic passage 56, valve passage 50C of solenoid valve Y2, hydraulic passage 60, valve passage 74C of solenoid valve Y3, and hydraulic passage 70. Clutch KV is exposed to drain 72 via hydraulic passage 68 and valve passage 74D of solenoid valve Y3, and hence, is not engaged.

Placing shifter 24 into the first reverse gear position closes switches N, R, B1, and B3. Electrical power flowing through switch N is directed through switches R, B1, and B3, and hence, is delivered to solenoid valves Y2, Y5, and Y3, respectively, placing solenoid valves Y2, Y5, and Y3 in the energized state. Since forward switch F and switch B2 are not closed, solenoid valves Y1 and Y4 remain in a de-energized state. Because switches R is closed, high-range reverse relay 78 is activated. However, since switch B4 is not closed, power is not provided via switch B4 to activate disable relay 76.

With shifter 24 in the first reverse gear position, hydraulic pressure from hydraulic pressure source 16 is directed to engage clutch K1 via hydraulic passage 32, valve passage 28C of solenoid valve Y4, hydraulic passage 34, valve passage 30A of solenoid valve Y5, and hydraulic passage 38. Clutch K2 is exposed to drain 44 via hydraulic passage 40 and valve passage 30B, and hence, is not engaged.

In addition, hydraulic pressure from hydraulic pressure source 16 is directed to engage clutch KR via hydraulic passage 52, valve passage 48C of solenoid valve Y1, hydraulic passage 54, valve passage 50A of solenoid valve Y2, and hydraulic passage 58. Clutch KV valve is exposed to drain 64 via hydraulic passage 68, valve passage 74A of solenoid valve Y3, hydraulic passage 60, and valve passage 50B of solenoid valve Y2, and hence, is not engaged. Clutch K4 is exposed to drain 72 via hydraulic passage 70 and valve passage 74B of solenoid valve Y3, and hence, is not engaged.

Placing shifter 24 into the second reverse gear position closes switches N, R, B2, and B3. Electrical power flowing through switch N is directed through switches R, B2, and B3, and hence, is delivered to solenoid valves Y2, Y4, and Y3, respectively, placing solenoid valves Y2, Y4, and Y3 in the energized state. Since forward switch F and switch B1 are not closed, solenoid valves Y1 and Y5 remain in a de-energized state. Because switch R is closed, high-range reverse relay 78 is activated. However, since switch B4 is not closed, power is not provided via switch B4 to activate disable relay 76.

With shifter 24 in the second reverse gear position, hydraulic pressure from hydraulic pressure source 16 is directed to engage clutch K2 via hydraulic passage 32, valve passage 28A of solenoid valve Y4, hydraulic passage 36, valve passage 30C of solenoid valve Y5, and hydraulic passage 40. Clutch K1 is exposed to drain 44 via hydraulic passage 38, valve passage 30D, and hence, is not engaged.

In addition, hydraulic pressure from hydraulic pressure source 16 is directed to engage clutch KR via hydraulic passage 52, valve passage 48C of solenoid valve Y1, hydraulic passage 54, valve passage 50A of solenoid valve Y2, and hydraulic passage 58. Clutch KV valve is exposed to drain 64 via hydraulic passage 68, valve passage 74A of solenoid valve Y3, hydraulic passage 60, and valve passage 50B of solenoid valve Y2, and hence, is not engaged. Clutch K4 is exposed to drain 72 via hydraulic passage 70 and valve passage 74B of solenoid valve Y3, and hence, is not engaged.

As set forth below, placing shifter 24 into the third or forth reverse gear positions yields the same clutch engagement as when shifter 24 is placed in the second reverse gear position, since in the present embodiment, transmission 12 is a 4×2 transmission, having four forward gears and two reverse gears. However, it will be understood that the transmission shift system of the present invention is not limited to a transmission having four forward gears and two reverse gears, or to a transmission having any particular number of forward and reverse gears.

Placing shifter 24 in the third reverse gear position closes switches N, R, B1, and B4. Electrical power flowing through switch N is directed through switches R, B1, and B4. Electrical power via switch R to solenoid valve Y2 places solenoid valve Y2 in the energized state. Because switch R is closed, high-range reverse relay 78 is activated, directing power from switch B4 to activate disable relay 76. The activation of disable relay 76 places switch B1 in direct electrical connection with solenoid valve Y4 instead of solenoid valve Y5, and hence, solenoid valve Y4 is placed into the energized state, whereas solenoid valve Y5 remains in the de-energized state. Because switches F and B3 are not energized, solenoid valve Y1 and solenoid valve Y3 remain in the de-energized state.

Since solenoid valve Y4 is in the energized state and solenoid valve Y5 is in the de-energized state, clutch K2 is engaged and clutch K1 is drained in the same manner as that described above with respect to the second reverse gear position of shifter 24. Since solenoid valve Y1 is in the de-energized state, and solenoid valve Y2 is in the energized state, clutch KR is engaged in the same manner as that described above with respect to the second reverse gear position of shifter 24. Clutch KV is exposed to drain 72 via hydraulic passage 68 and valve passage 74D of solenoid valve Y3, and hence, is not engaged. Clutch K4 is exposed to drain 64 via hydraulic passage 70, valve passage 74C of solenoid valve Y3, hydraulic passage 60, and valve passage 50B of solenoid valve Y2, and hence, is not engaged.

Placing shifter 24 in the fourth reverse gear position closes switches N, R, B2, and B4. Electrical power flowing through switch N is directed through switches R, B2, and B4, placing solenoid valves Y2 and Y4 into the energized state, whereas solenoid valves Y1, Y3, and Y5 remain in the de-energized state. Clutches K2 and KR are engaged and clutches K1 and K4 are drained, and hence, not engaged, in the same manner described above with respect to the third reverse gear position of shifter 24.

Referring now to TABLE 2, below, the operational effect for the position of each switch and solenoid of the present embodiment is depicted for each position of shifter 24. In TABLE 2, "zero state" pertains to the de-energized state of a solenoid and the open state of a switch, whereas "power state" pertains to the energized state of a solenoid and the closed position of a switch.

TABLE 2

Single-point failure modes and resultant transmission states for the embodiment of FIG. 2.

| FAILURE MODE/ SHIFTER | N | 1F | 2F | 3F | 4F | 1R | 2R | 3R | 4R | OPERATIONAL EFFECT |
|---|---|---|---|---|---|---|---|---|---|---|
| N OPEN | N | N | N | N | N | N | N | N | N | NO FWD/REV |
| N CLOSED | N | 1F | 2F | 3F | 4F | 1R | 2R | 3R | 4R | NO MACHINE 10 START |
| Y1 ZERO STATE | N | N | N | N | N | 1R | 2R | 3R | 4R | NO FWD |
| Y1 POWER STATE | N | 1F | 2F | 3F | 4F | N | N | N | N | NO REV |
| F OPEN STATE | N | N | N | N | N | 1R | 2R | 3R | 4R | NO FWD |
| F CLOSED STATE | N | 1F | 2F | 3F | 4F | N | N | N | N | NO REV |
| Y2 ZERO STATE | N | 1F | 2F | 3F | 4F | N | N | N | N | NO REV |
| Y2 POWER STATE | N | N | N | N | N | 1R | 2R | 3R | 4R | NO FWD |
| R OPEN STATE | N | 1F | 2F | 3F | 4F | N | N | N | N | NO REV |
| R CLOSED STATE | N | N | N | N | N | 1R | 2R | 3R | 4R | NO FWD |
| Y3/B3 ZERO STATE | N | 3F | 4F | 3F | 4F | 1R | 2R | 3R | 4R | WRONG 1F/2F |
| Y3/B3 POWER STATE | N | 1F | 2F | 1F | 2F | 1R | 2R | 3R | 4R | WRONG 3F/4F |
| Y4/B2 ZERO STATE | N | 1F | N | 3F | N | 1R | N | N | N | NO 2F/4F/2R/3R/4R |
| Y4/B2 POWER STATE | N | N | 2F | N | 4F | N | 2R | 3R | 4R | NO 1F/3F/1R |
| Y5/B1 ZERO STATE | N | N | 2F | N | 4F | N | 2R | 3R | 4R | NO 1F/3F/1R |
| Y5/B1 POWER STATE | N | 1F | N | 3F | N | 1R | N | N | N | NO 2F/4F/2R/3R/4R |
| B4 OPEN STATE | N | 1F | 2F | 3F | 4F | 1R | 2R | 1R | 2R | WRONG 3R/4R |
| B4 CLOSED STATE | N | 1F | 2F | 3F | 4F | 2R | 2R | 3R | 4R | WRONG 1R |
| RELAY 78 OPEN | N | 1F | 2F | 3F | 4F | 1R | 2R | 1R | 2R | WRONG 3R/4R |
| RELAY 78 CLOSED | N | 1F | 2F | 4F | 4F | 1R | 2R | 3R | 4R | WRONG 3F |
| RELAY 76 CLOSED | N | 1F | 2F | 3F | 4F | 1R | 2R | 1R | 4R | WRONG 3R |
| RELAY 76 OPEN | N | 2F | 2F | 4F | 4F | 2R | 2R | 3R | 4R | WRONG 1F/3F/1R |

It will be seen from TABLE 2 and the above description of an embodiment of the present invention that the present inventive transmission shift system 14 may allow for an easy diagnosis of any single point failure, that is, the failure of a single component of transmission shift, e.g., a solenoid valve or a switch. As would be appreciated by one skilled in the art, the failure of a single component of transmission shift system 14 may be diagnosed by engaging shifter 24 into each gear position, observing the output of transmission 12, consulting TABLE 2, and performing continuity checks of the switch, solenoid, or relay indicated in TABLE 2, as required, based on the output of transmission 1 2 for the different gear positions of shifter 24.

In addition, from TABLE 2, it is seen that a single point failure may not result in unintended motion of work machine 10, that is, movement of work machine 10 in a direction opposite than that desired (as indicated by the position of shifter 24 in either a forward or reverse gear position), or movement of work machine 10 in any direction when shifter 24 is placed in neutral.

Figure 3:
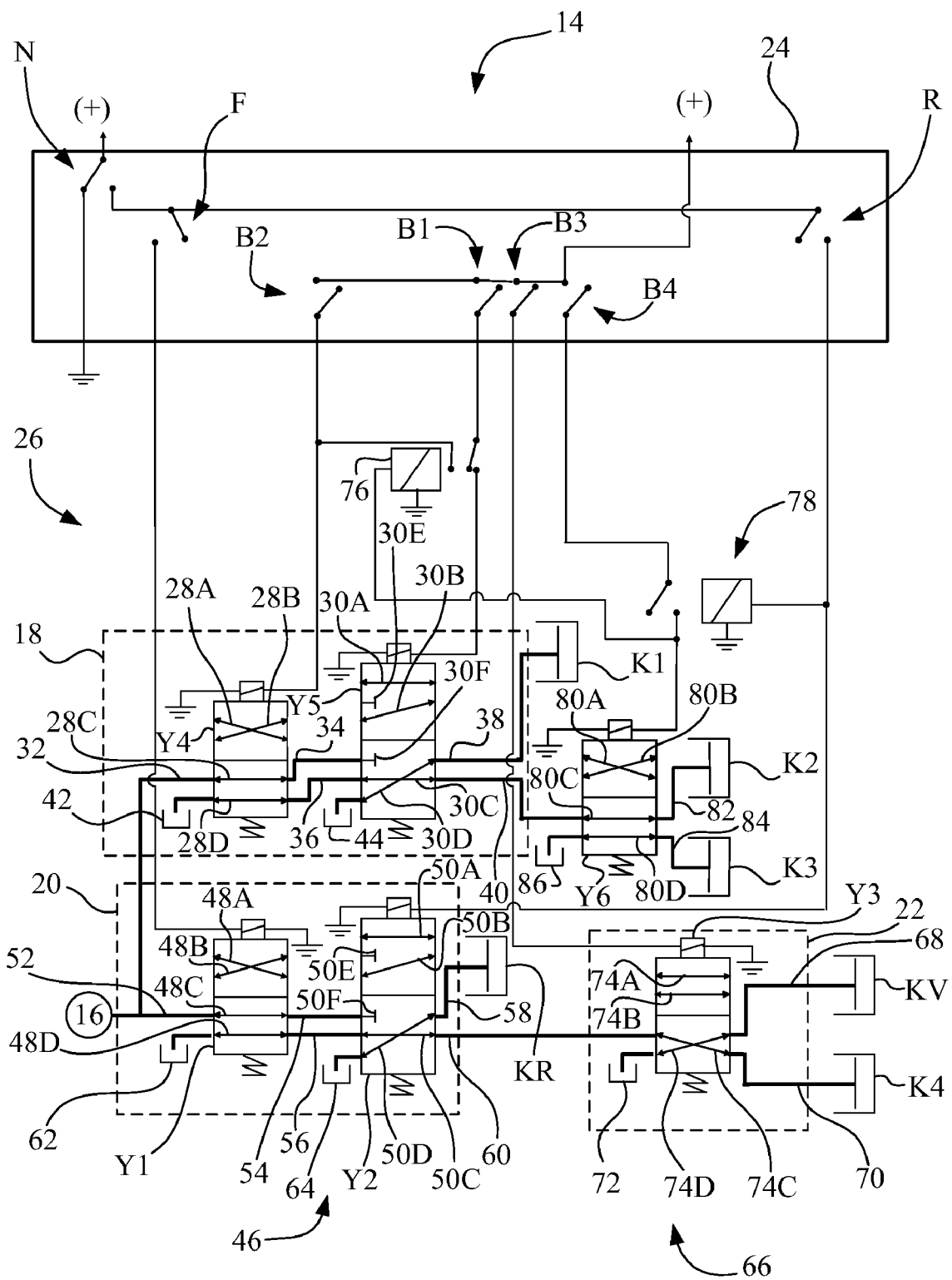
FIG. 3 is a schematic diagram of a transmission shift system in accordance with another embodiment of the present invention.

Referring now to FIG. 3, another embodiment of transmission shift system 14 in accordance with the present invention is depicted. In the embodiment of FIG. 3, transmission 12 is a 4×3 transmission, that is, a transmission having four forward gears and three reverse gears. Hence, the first plurality of clutches for determining only an output speed of transmission includes both clutches K1 and K2, as in the embodiment of FIG. 2, and also includes a clutch K3.

The embodiment of FIG. 3 is similar to the embodiment of FIG. 2, but also includes another solenoid valve Y6 as part of electrically actuated valve system 26 to selectively direct hydraulic pressure to clutches K2 and K3, i.e., to control as between clutches K2 and K3. In addition, in the embodiment of FIG. 3, switch B4 is in direct electrical connection with solenoid valve Y6 to controllerlessly operate solenoid valve Y6, and hence, control path 22.

Solenoid valve Y6 includes valve passages 80A-80D. Whereas in the embodiment of FIG. 2, clutch K2 is in fluidic connection with solenoid valve Y5 via hydraulic passage 40, in the embodiment of FIG. 3, solenoid valve Y6 is in fluidic connection with solenoid valve Y5 via hydraulic passage 40, and clutch K2 is in fluidic connection with solenoid valve Y6 via a hydraulic passage 82. Clutch K3 is in fluidic connection with solenoid valve Y6 via a hydraulic passage 84. A drain 86 is in fluidic connection with solenoid valve Y6.

Referring now to TABLE 3, in conjunction with FIG. 3, the operation of the embodiment of FIG. 3 is now described. TABLE 3 depicts, for each gear position of shifter 24 the energized solenoids, engaged clutches, and closed switches B1-B4, as indicated by an "X" in the appropriate columns of TABLE 3. The gear positions of shifter 24 are first through fourth forward gear positions (1F-4F), neutral (N), and first through fourth reverse gear positions (1R-4R). Switch N is closed, except when shifter 24 is placed in neutral, switch F is closed only when a forward gear position is selected, and switch R is closed only when a reverse gear position is selected.

As seen from TABLE 3, the operation of the embodiment of FIG. 3 is similar to the operation of the embodiment of FIG. 2. However, it is noted that the hydraulic circuit through which clutch K2 is engaged and drained in the embodiment of FIG. 3 includes valve passage 80C of solenoid valve Y6, and hydraulic passage 82. As set forth in TABLE 3, solenoid valve Y6 is de-energized for first through fourth forward (1F-4F), and first and second reverse (1R, 2R) gear positions of shifter 24, and hence, the description of the operation of the embodiment of FIG. 2 generally applies to the operation of the embodiment of FIG. 3 for gear positions 1F-4F, 1R, and 2R, except as noted herein. When solenoid valve Y6 is in the de-energized state, clutch K3 is exposed to drain 86 via hydraulic passage 84 and valve passage 80D. A description of the operation of the third and fourth reverse gears (3R and 4R) of the embodiment of FIG. 3 follows.

Placing shifter 24 in the third reverse gear position closes switches N, R, B1, and B4, with electrical power flowing through switch N being directed through switches R, B1, and B4. Electrical power via switches R solenoid valve Y2 places solenoid valve Y2 in the energized state. Because switch R is closed, high-range reverse relay 78 is activated, directing power from switch B4 to solenoid valve Y6, which places solenoid valve Y6 in the energized state, and also activating disable relay 76. The activation of disable relay 76 places switch B1 in direct electrical connection with solenoid valve Y4 instead of solenoid valve Y5, and hence, solenoid valve Y4 is placed into the energized state, whereas solenoid valve Y5 remains in the de-energized state. Because switches F and B3 are not energized, solenoid valve Y1 and solenoid valve Y3 remain in the de-energized state.

Since solenoid valve Y4 is in the energized state, solenoid valve Y5 is in the de-energized state, and solenoid valve Y6 is in the energized state, hydraulic pressure from hydraulic pressure source 16 is directed to engage clutch K3 via hydraulic passage 32, valve passage 28A of solenoid valve Y4, hydraulic passage 36, valve passage 30C of solenoid valve Y5, hydraulic passage 40, valve passage 80A of solenoid valve Y6, and hydraulic passage 84. Clutch K1 is exposed to drain 44 via hydraulic passage 38, valve passage 30D, and hence, is not engaged. Clutch K2 is exposed to drain 86 via hydraulic passage 82 and valve passage 80B, and hence, is not engaged.

Since solenoid valve Y1 is in the de-energized state, and solenoid valve Y2 is in the energized state, clutch KR is engaged in the same manner as that described above with respect to the second reverse gear position of shifter 24 in the embodiment of FIG. 2. Clutch K4 is exposed to drain 72 via hydraulic passage 70 and valve passage 74B of solenoid valve Y3. Clutch KV is exposed to drain 64 via hydraulic passage

TABLE 3

Energized solenoids, engaged clutches, and closed switches for each gear position of shifter 24 in the embodiment of FIG. 3.

| GEAR | ENERGIZED SOLENOIDS | | | | | | ENGAGED CLUTCHES | | | | | | CLOSED SWITCHES | | | |
|---|---|---|---|---|---|---|---|---|---|---|---|---|---|---|---|---|
| | Y1 | Y2 | Y3 | Y4 | Y5 | Y6 | KV | KR | K1 | K2 | K3 | K4 | B1 | B2 | B3 | B4 |
| 1F | X | | X | X | | | X | | X | | | | X | | X | |
| 2F | X | | X | X | | | X | | | X | | | X | X | | |
| 3F | X | | | X | | | | X | X | | | X | X | | | X |
| 4F | X | | | X | | | | | | X | | X | X | | | X |
| N | | | | | | | | | | | | | | | | |
| 1R | | X | X | | X | | | X | X | | | | X | | X | |
| 2R | | X | X | X | | | | X | | X | | | X | X | | |
| 3R | | X | | X | | X | | X | | | X | | X | | | X |
| 4R | | X | | X | | X | | | | | X | X | X | | | X |

68, valve passage 74A of solenoid valve Y3, hydraulic passage 60, and valve passage 50B of solenoid valve Y2.

In addition, hydraulic pressure from hydraulic pressure source 16 is directed to engage clutch KR via hydraulic passage 52, valve passage 48C of solenoid valve Y1, hydraulic passage 54, valve passage 50A of solenoid valve Y2, and hydraulic passage 58. Clutch K4 valve is exposed to drain 72 via hydraulic passage 70 and valve passage 74B of solenoid valve Y3, and hence, is not engaged. Clutch KV is exposed to drain 64 via hydraulic passage 68, valve passage 74A of solenoid valve Y3, hydraulic passage 60, and valve passage 50B of solenoid valve Y2, and hence, is not engaged.

Placing shifter 24 into the fourth reverse gear position closes switches N, R, B2, and B4, yielding the same operational results as set forth above with respect to the third gear position, except that electrical power to solenoid valve Y4 is provided via switch B2 instead of switch B1.

Referring now to TABLE 4, below, the operational effect for the position of each switch and solenoid of the present embodiment is depicted for each position of shifter 24. In TABLE 4, "zero state" pertains to the de-energized state of a solenoid and the open state of a switch, whereas "power state" pertains to the energized state of a solenoid and the closed position of a switch.

TABLE 4, and performing continuity checks of the switch, solenoid, or relay indicated in TABLE 4, as required, based on the output of transmission 12 for the different gear positions of shifter 24.

In addition, from TABLE 4, it is seen that a single point failure may not result in unintended motion of work machine 10, that is, movement of work machine 10 in a direction opposite than that desired (as indicated by the position of shifter 24 in either a forward or reverse gear position), or movement of work machine 10 in any direction when shifter 24 is placed in neutral.

Having described at least one preferred embodiment, it will become apparent that various modifications can be made without departing from the scope of the invention as defined in the accompanying claims.

The invention claimed is:

1. A transmission shift system for a transmission having a first plurality of clutches for determining only an output speed of said transmission and a second plurality of clutches for determining only an output direction of said transmission, wherein said first plurality of clutches and said second plurality of clutches are hydraulically actuated via hydraulic pressure from a hydraulic pressure source, said transmission shift system comprising:

TABLE 4

Single-point failure modes and resultant transmission states for the embodiment of FIG. 3.

| FAILURE MODE/ SHIFTER | RESULTING TRANSMISSION STATE | | | | | | | | OPERATIONAL EFFECT |
|---|---|---|---|---|---|---|---|---|---|
| | N | 1F | 2F | 3F | 4F | 1R | 2R | 3R | 4R | |
| N OPEN | N | N | N | N | N | N | N | N | N | NO FWD/REV |
| N CLOSED | N | 1F | 2F | 3F | 4F | 1R | 2R | 3R | 4R | NO MACHINE 10 START |
| Y1 ZERO STATE | N | N | N | N | N | 1R | 2R | 3R | 4R | NO FWD |
| Y1 POWER STATE | N | 1F | 2F | 3F | 4F | N | N | N | N | NO REV |
| F OPEN STATE | N | N | N | N | N | 1R | 2R | 3R | 4R | NO FWD |
| F CLOSED STATE | N | 1F | 2F | 3F | 4F | N | N | N | N | NO REV |
| Y2 ZERO STATE | N | 1F | 2F | 3F | 4F | N | N | N | N | NO REV |
| Y2 POWER STATE | N | N | N | N | N | 1R | 2R | 3R | 4R | NO FWD |
| R OPEN STATE | N | 1F | 2F | 3F | 4F | N | N | N | N | NO REV |
| R CLOSED STATE | N | N | N | N | N | 1R | 2R | 3R | 4R | NO FWD |
| Y3/B3 ZERO STATE | N | 3F | 4F | 3F | 4F | 1R | 2R | 3R | 4R | WRONG 1F/2F |
| Y3/B3 POWER STATE | N | 1F | 2F | 1F | 2F | 1R | 2R | 3R | 4R | WRONG 3F/4F |
| Y4/B2 ZERO STATE | N | 1F | N | 3F | N | 1R | N | N | N | NO 2F/4F/2R/3R/4R |
| Y4/B2 POWER STATE | N | N | 2F | N | 4F | N | 2R | 3R | 4R | NO 1F/3F/1R |
| Y5/B1 ZERO STATE | N | N | 2F | N | 4F | N | 2R | 3R | 4R | NO 1F/3F/1R |
| Y5/B1 POWER STATE | N | 1F | N | 3F | N | 1R | N | N | N | NO 2F/4F/2R/3R/4R |
| Y6 ZERO STATE | N | 1F | 2F | 3F | 4F | 1R | 2R | 2R | 2R | NO 3R/4R |
| Y6 POWER STATE | N | 1F | 2.5F | 3F | 4.5F | 1R | 3R | 3R | 4R | WRONG 2F/4F/2R |
| B4 OPEN STATE | N | 1F | 2F | 3F | 4F | 1R | 2R | 1R | 2R | WRONG 3R/4R |
| B4 CLOSED STATE | N | 1F | 2F | 3F | 4F | 3R | 3R | 3R | 4R | WRONG 1R/2R |
| RELAY 78 OPEN | N | 1F | 2F | 3F | 4F | 1R | 2R | 1R | 2R | WRONG 3R/4R |
| RELAY 78 CLOSED | N | 1F | 2F | 4.5F | 4.5F | 1R | 2R | 3R | 4R | WRONG 3F/4F |
| RELAY 76 CLOSED | N | 1F | 2F | 3F | 4F | 1R | 2R | 1R | 4R | WRONG 3R |
| RELAY 76 OPEN | N | 2F | 2F | 4F | 4F | 2R | 2R | 3R | 4R | WRONG 1F/3F/1R |

It will be seen from TABLE 4 and the above description of an embodiment of the present invention that the present inventive transmission shift system 14 may allow for an easy diagnosis of any single point failure, that is, the failure of a single component of transmission shift, e.g., a solenoid valve or a switch. As would be appreciated by one skilled in the art, the failure of a single component of transmission shift system 14 may be diagnosed by engaging shifter 24 into each gear position, observing the output of transmission 12, consulting a first control path in fluidic connection with said hydraulic pressure source, said first control path including a first electrically actuated valve system including a first solenoid value pair configured to selectively direct said hydraulic pressure to said first plurality of clutches for selecting only said output speed;

a second control path in fluidic connection with said hydraulic pressure source, said second control path including a second electrically actuated valve system and being configured to selectively direct said hydraulic pressure to said second plurality of clutches for selecting only said output direction, said second control path being independent of said first control path; and a shifter having a plurality of switches, each switch of said plurality of switches being in direct electrical connection with a corresponding of said first electrically actuated valve system and said second electrically actuated valve system for operating said first control path and said second control path controllerlessly, a first subset of said plurality of switches being in direct electrical connection with said first solenoid pair to controllerlessly operate said first solenoid valve pair, wherein said plurality of switches are operated manually using said shifter.

2. The transmission shift system of claim 1, said first solenoid valve pair including a first solenoid valve and a second solenoid valve, each of said first solenoid valve and said second solenoid valve having an energized state and a de-energized state, said first solenoid valve and said second solenoid valve being jointly configured to provide said hydraulic pressure to one or more clutch of said first plurality of clutches only when said first solenoid valve is in one of an energized state and a de-energized state and said second solenoid valve is in the other of said one of said energized state and said de-energized state.

3. The transmission shift system of claim 1,
wherein said first control path includes a plurality of drains, and
wherein said first solenoid valve pair includes a first solenoid valve and a second solenoid valve, each of said first solenoid valve and said second solenoid valve having an energized state and a de-energized state, said first solenoid valve and said second solenoid valve being jointly configured to drain said hydraulic pressure from said first plurality of clutches into at least one drain of said plurality of drains when said first solenoid valve and said second solenoid valve are both in the same of one of said energized state and said de-energized state.

4. The transmission shift system of claim 3, wherein said first electrically actuated valve system includes an other solenoid valve to selectively direct said hydraulic pressure to a subset of said first plurality of clutches; and
a second subset of said plurality of switches is in direct electrical connection with said other solenoid valve to controllerlessly operate said third solenoid valve.

5. The transmission shift system of claim 1, wherein:
said second electrically actuated valve system including a second solenoid valve pair being configured to selectively direct said hydraulic pressure to said second plurality of clutches; and
a second subset of said plurality of switches is in direct electrical connection with said second solenoid valve pair to controllerlessly operate said second solenoid valve pair.

6. The transmission shift system of claim 5, wherein said second solenoid valve pair includes a third solenoid valve and a fourth solenoid valve, each of said third solenoid valve and said fourth solenoid valve having an energized state and a de-energized state, said third solenoid valve and fourth second solenoid valve being jointly configured to provide said hydraulic pressure to one or more clutch of said second plurality of clutches only when said third solenoid valve is in one of an energized state and a de-energized state and said fourth solenoid valve is in the other of said one of said energized state and said de-energized state.

7. The transmission shift system of claim 6, wherein
said second control path includes a plurality of drains, and
said third solenoid valve and fourth second solenoid valve are jointly configured to drain said hydraulic pressure from said second plurality of clutches into at least one drain of said plurality of drains when said third solenoid valve and said fourth solenoid valve are both in the same of one of said energized state and said de-energized state.

8. The transmission shift system of claim 1, said transmission having at least two clutches for determining one of a high speed range and a low speed range, further comprising:
a third control path in fluidic connection with said second control path, said third control path including a third electrically actuated valve system and being configured to selectively direct said hydraulic pressure to said at least two clutches for selecting said one of said high speed range and said low speed range,
wherein said plurality of switches includes at least one switch in direct electrical connection with said third electrically actuated valve system for operating said third control path controllerlessly.

9. A transmission shift system for a transmission having a plurality of clutches for engaging a corresponding plurality of gears of said transmission, wherein said plurality of clutches are hydraulically actuated via hydraulic pressure from a hydraulic pressure source, said transmission shift system comprising:
a first hydraulic passage exposed to said hydraulic pressure source;
a first solenoid valve in fluidic connection with said first hydraulic passage;
a second solenoid valve;
a second hydraulic passage fluidly coupling said first solenoid valve and said second solenoid valve;
a third hydraulic passage fluidly coupling said first solenoid valve and said second solenoid valve;
a fourth hydraulic passage fluidly coupling said second solenoid valve with at least a first clutch of said plurality of clutches; and
a fifth hydraulic passage fluidly coupling said second solenoid valve with at least a second clutch of said plurality of clutches,
each of said first solenoid valve and said second solenoid valve having only an energized state and a de-energized state, said first solenoid valve and said second solenoid valve being jointly configured to channel said hydraulic pressure to only one of said fourth hydraulic passage and said fifth hydraulic passage when said first solenoid valve is in the other of said one of said energized state and said de-energized state; and
said first solenoid valve and said second solenoid valve being jointly configured to channel said hydraulic pressure to only the other of said energized state and said de-energized state and the second solenoid valve si in said one of said energized state and said de-energized state.

10. The transmission shift system of claim 9, wherein said first solenoid valve and said second solenoid valve are configured to shield both said fourth hydraulic passage and said fifth hydraulic passage from said hydraulic pressure when both said first solenoid valve and said second solenoid valve are in the same of said one of said energized state and said de-energized state.

11. The transmission shift system of claim 9, further comprising:

a first drain in fluidic connection with said first solenoid valve; and a second drain in fluidic connection with said second solenoid valve, wherein said first solenoid valve and said second solenoid valve are configured to fluidly expose said fourth hydraulic passage to one of said first drain and said second drain and to fluidly expose said fifth hydraulic passage to the other of said first drain and said second drain when both said first solenoid valve and said second solenoid valve are in the same of said one of said energized state and said de-energized state.

12. A work machine, comprising:

a transmission having a first plurality of clutches for determining only an output speed of said transmission and a second plurality of clutches for determining only an output direction of said transmission, wherein said first plurality of clutches and said second plurality of clutches are hydraulically actuated via hydraulic pressure from a hydraulic pressure source; and a transmission shift system for shifting said transmission, said transmission shift system including:

a first control path in fluidic connection with said hydraulic pressure source, said first control path including a first electrically actuated valve system and being configured to selectively direct said hydraulic pressure to said first plurality of clutches for selecting only said output speed;

a second control path in fluidic connection with said hydraulic pressure source, said second control path including a second electrically actuated valve system and being configured to selectively direct said hydraulic pressure to said second plurality of clutches for selecting only said output direction, said second control path being independent of said first control path; and a shifter having a plurality of switches, each switch of said plurality of switches being in direct electrical connection with a corresponding of said first electrically actuated valve system including a first solenoid valve pair configured to selectively direct said hydraulic pressure to said first plurality of clutches and said second electrically actuated valve system for operating said first control path and said second control path controllerlessly to shift said transmission of said work machine, a first subset of said plurality of switches being in direct electrical connection with said first solenoid valve pair to controllerlessly operate said first solenoid valve pair, wherein said plurality of switches are operated manually using said shifter.

13. The work machine of claim 12, wherein in said transmission shift system:

said first solenoid valve pair includes a first solenoid valve and a second solenoid valve, each of said first solenoid valve and said second solenoid valve having an energized state and a de-energized state, said first solenoid valve and said second solenoid valve being jointly configured to provide said hydraulic pressure to one or more clutch of said first plurality of clutches only when said first solenoid valve is in one of an energized state and a de-energized state and said second solenoid valve is in the other of said one of said energized state and said de-energized state.

14. The work machine of claim 12, wherein in said transmission shift system:

said first control path includes a plurality of drains, and said first solenoid valve pair includes a first solenoid valve and a second solenoid valve, each of said first solenoid valve and said second solenoid valve having an energized state and a de-energized state, said first solenoid valve and said second solenoid valve being jointly configured to drain said hydraulic pressure from said first plurality of clutches into at least one drain of said plurality of drains when said first solenoid valve and said second solenoid valve are both in the same of one of said energized state and said de-energized state.

15. The work machine of claim 14, wherein in said transmission shift system:

said first electrically actuated valve system includes an other solenoid valve to selectively direct said hydraulic pressure to a subset of said first plurality of clutches; and a second subset of said plurality of switches is in direct electrical connection with said other solenoid valve to controllerlessly operate said third solenoid valve.

16. The work machine of claim 12, wherein in said transmission shift system:

said second electrically actuated valve system includes a second solenoid valve pair being configured to selectively direct said hydraulic pressure to said second plurality of clutches; and a second subset of said plurality of switches is in direct electrical connection with said second solenoid valve pair to controllerlessly operate said second solenoid valve pair.

17. The work machine of claim 16, wherein in said transmission shift system:

said second solenoid valve pair includes a third solenoid valve and a fourth solenoid valve, each of said third solenoid valve and said fourth solenoid valve having an energized state and a de-energized state, said third solenoid valve and fourth second solenoid valve being jointly configured to provide said hydraulic pressure to one or more clutch of said second plurality of clutches only when said third solenoid valve is in one of an energized state and a de-energized state and said fourth solenoid valve is in the other of said one of said energized state and said de-energized state.

18. The work machine of claim 16, wherein in said transmission shift system:

said second control path includes a plurality of drains, and said third solenoid valve and fourth second solenoid valve are jointly configured to drain said hydraulic pressure from said second plurality of clutches into at least one drain of said plurality of drains when said third solenoid valve and said fourth solenoid valve are both in the same of one of said energized state and said de-energized state.

19. The work machine of claim 12, said transmission having at least two clutches for determining one of a high speed range and a low speed range, said transmission shift system further including:

a third control path in fluidic connection with said second control path, said third control path being configured to control said at least two clutches for selecting said one of said high speed range and said low speed range, said third control path including a third electrically actuated valve system configured to selectively direct said hydraulic pressure to said at least two clutches, wherein said plurality of switches includes at least one switch in direct electrical connection with said third electrically actuated valve system for operating said third control path controllerlessly.

20. A work machine, comprising:
a transmission having a plurality of clutches for engaging a corresponding plurality of gears of said transmission, wherein said plurality of clutches are hydraulically actuated via hydraulic pressure from a hydraulic pressure source; and
a transmission shift system for shifting said transmission, said transmission shift system including:
a first hydraulic passage exposed to said hydraulic pressure source;
a first solenoid valve in fluidic connection with said first hydraulic passage;
a second solenoid valve;
a second hydraulic passage fluidly coupling said first solenoid valve and said second solenoid valve;
a third hydraulic passage fluidly coupling said first solenoid valve and said second solenoid valve;
a fourth hydraulic passage fluidly coupling said second solenoid valve with at least a first clutch of said plurality of clutches; and
a fifth hydraulic passage fluidly coupling said second solenoid valve with at least a second clutch of said plurality of clutches,
each of said first solenoid valve and said second solenoid valve having only an energized state and a de-energized state, said first solenoid valve and said second solenoid valve being jointly configured to channel said hydraulic pressure to only one of said fourth hydraulic passage and said fifth hydraulic passage when said first solenoid valve is in one of said energized state and said de-energized state; and
said first solenoid valve and said second solenoid valve being jointly configured to channel said hydraulic pressure to only the other of said fourth hydraulic passage and said fifth hydraulic passage when said first solenoid valve is in the other of said energized state and said de-energized state and said second solenoid valve is in said one of said energized state and said de-energized state.

21. The work machine of claim 20, wherein in said transmission shift system:, wherein said first solenoid valve and said second solenoid valve are configured to shield both said fourth hydraulic passage and said fifth hydraulic passage from said hydraulic pressure when both said first solenoid valve and said second solenoid valve are in the same of said one of said energized state and said de-energized state.

22. The work machine of claim 20, said transmission shift system further including:
a first drain in fluidic connection with said first solenoid valve; and
a second drain in fluidic connection with said second solenoid valve,
wherein said first solenoid valve and said second solenoid valve are configured to fluidly expose said fourth hydraulic passage to one of said first drain and said second drain and to fluidly expose said fifth hydraulic passage to the other of said first drain and said second drain when both said first solenoid valve and said second solenoid valve are in the same of said one of said energized state and said de-energized state.

* * * * *